(12) United States Patent
Kim et al.

(10) Patent No.: US 10,200,374 B1
(45) Date of Patent: Feb. 5, 2019

(54) TECHNIQUES FOR DETECTING MALICIOUS FILES

(71) Applicant: Symantec Corporation, Mountain View, CA (US)

(72) Inventors: Samuel Kim, Culver City, CA (US); Everett J. Lai, Monterey, CA (US); Thuan Vo, Eastvale, CA (US)

(73) Assignee: SYMANTEC CORPORATION, Mountain View, CA (US)

(*) Notice: Subject to any disclaimer, the term of this patent is extended or adjusted under 35 U.S.C. 154(b) by 130 days.

(21) Appl. No.: 15/056,588

(22) Filed: Feb. 29, 2016

(51) Int. Cl.
*H04L 29/06* (2006.01)

(52) U.S. Cl.
CPC ........ *H04L 63/101* (2013.01); *H04L 63/1408* (2013.01); *H04L 63/1416* (2013.01)

(58) Field of Classification Search
CPC . H04L 63/101; H04L 63/145; H04L 63/1408; H04L 63/1416; G06F 21/56; G06F 21/562; G06F 21/564; G06F 21/565
See application file for complete search history.

(56) References Cited

U.S. PATENT DOCUMENTS

| | | | | |
|---|---|---|---|---|
| 8,607,345 B1* | 12/2013 | Cruz | ...................... | G06F 21/566 726/22 |
| 9,124,622 B1* | 9/2015 | Falkowitz | ........... | H04L 63/1416 |
| 9,203,862 B1* | 12/2015 | Kashyap | ................ | H04L 63/145 |
| 2003/0088680 A1* | 5/2003 | Nachenberg | ............ | G06F 21/56 709/229 |
| 2007/0150957 A1* | 6/2007 | Hartrell | ................. | G06F 21/552 726/24 |
| 2007/0208822 A1* | 9/2007 | Wang | .................. | H04L 63/1416 709/217 |
| 2015/0264062 A1* | 9/2015 | Hagiwara | ............... | G06F 21/56 726/24 |
| 2015/0371043 A1* | 12/2015 | Bejerasco | ............... | G06F 21/51 726/22 |
| 2016/0080399 A1* | 3/2016 | Harris | ................. | H04L 63/1433 726/23 |
| 2016/0173510 A1* | 6/2016 | Harris | ................. | H04L 63/1416 726/23 |
| 2017/0237749 A1* | 8/2017 | Wood | .................... | H04L 63/145 726/23 |

* cited by examiner

*Primary Examiner* — Joseph P Hirl
*Assistant Examiner* — Thomas A Gyorfi
(74) *Attorney, Agent, or Firm* — Maschoff Brennan

(57) ABSTRACT

Techniques for detecting malicious files are disclosed. In one embodiment, the techniques may be realized as a system for detecting malicious files comprising one or more computer processors. The one or more computer processors may be configured to collect at least one of a file or an attribute of the file. The one or more computer processors may further be configured to determine if the file is malicious. The one or more computer processors may further be configured to identify, if the file is determined to be malicious, a Uniform Resource Locator (URL) and a time frame associated with the file. The one or more computer processors may further be configured to detect a threat based on the URL and the time frame.

20 Claims, 4 Drawing Sheets

TECHNIQUES FOR DETECTING MALICIOUS FILES

FIELD OF THE DISCLOSURE

The present disclosure relates generally to malware, and, more particularly, to techniques for detecting malicious files.

BACKGROUND OF THE DISCLOSURE

Malware may often be polymorphic. In other words, every malware file may be very different. Accordingly, it may be difficult to have a generic detection mechanism that can detect malware.

Malware is often distributed from malicious servers. In some instances, malicious servers are those that are dedicated to distributing malware. In other instances, benign servers might be compromised by hackers to become malicious servers. Those servers may be malicious for a specific time period. In addition, those servers may serve benign files while serving malicious files at the same time.

In view of the foregoing, it may be understood that there may be a need to detect malware efficiently.

SUMMARY OF THE DISCLOSURE

Techniques for detecting malicious files are disclosed. In one embodiment, the techniques may be realized as a system for detecting malicious files comprising one or more computer processors. The one or more computer processors may be configured to collect at least one of a file or an attribute of the file. The one or more computer processors may further be configured to determine if the file is malicious. The one or more computer processors may further be configured to identify, if the file is determined to be malicious, a Uniform Resource Locator (URL) and a time frame associated with the file. The one or more computer processors may further be configured to detect a threat based on the URL and the time frame.

In accordance with other aspects of this embodiment, the one or more computer processors may further be configured to determine if the file is malicious based on external information.

In accordance with other aspects of this embodiment, the one or more computer processors may further be configured to create a block policy based on the URL and the time frame.

In accordance with other aspects of this embodiment, the one or more computer processors may further be configured to mitigate the block policy based on a file signer.

In accordance with other aspects of this embodiment, the one or more computer processors may further be configured to add files associated with the URL and the time frame to a knowledge base of malware.

In accordance with other aspects of this embodiment, the file is associated with a plurality of URLs.

In accordance with other aspects of this embodiment, the one or more computer processors may further be configured to apply the block policy to a device.

In another embodiment, the techniques may be realized as a computer-implemented method for detecting malicious files. According to the method at least one of a file or an attribute of a file may be collected. Whether the file is malicious may be determined. If the file is determined to be malicious, a URL and a time frame associated with the file may be identified. A threat based on the URL and the time frame may be detected.

In still another embodiment, the techniques may be realized as a non-transitory computer readable medium storing a computer-readable program of detecting malicious files. The program may include computer-readable instructions to collect at least one of a file or an attribute of a file. The program may further include computer-readable instructions to determine if the file is malicious. The program may further include computer-readable instructions to identify, if the file is determined to be malicious, a URL and a time frame associated with the file. The program may further include computer-readable instructions to detect a threat based on the URL and the time frame.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In some embodiments, a system to detect malicious files as disclosed herein includes gathering at least a file or an attribute of the file and determining if the file is malicious. In some embodiments, the system to detect malicious files is implemented such that if the file is determined as malicious, a URL and a time frame associated with the file is identified. A threat based on the URL and the time frame is detected. In some implementations, a block policy is created and applied such that any file loaded from the URL during the time frame is deeded as malicious and blocked. In other implementations, network connections for the URL during the time frame are blocked.

Figure 1:
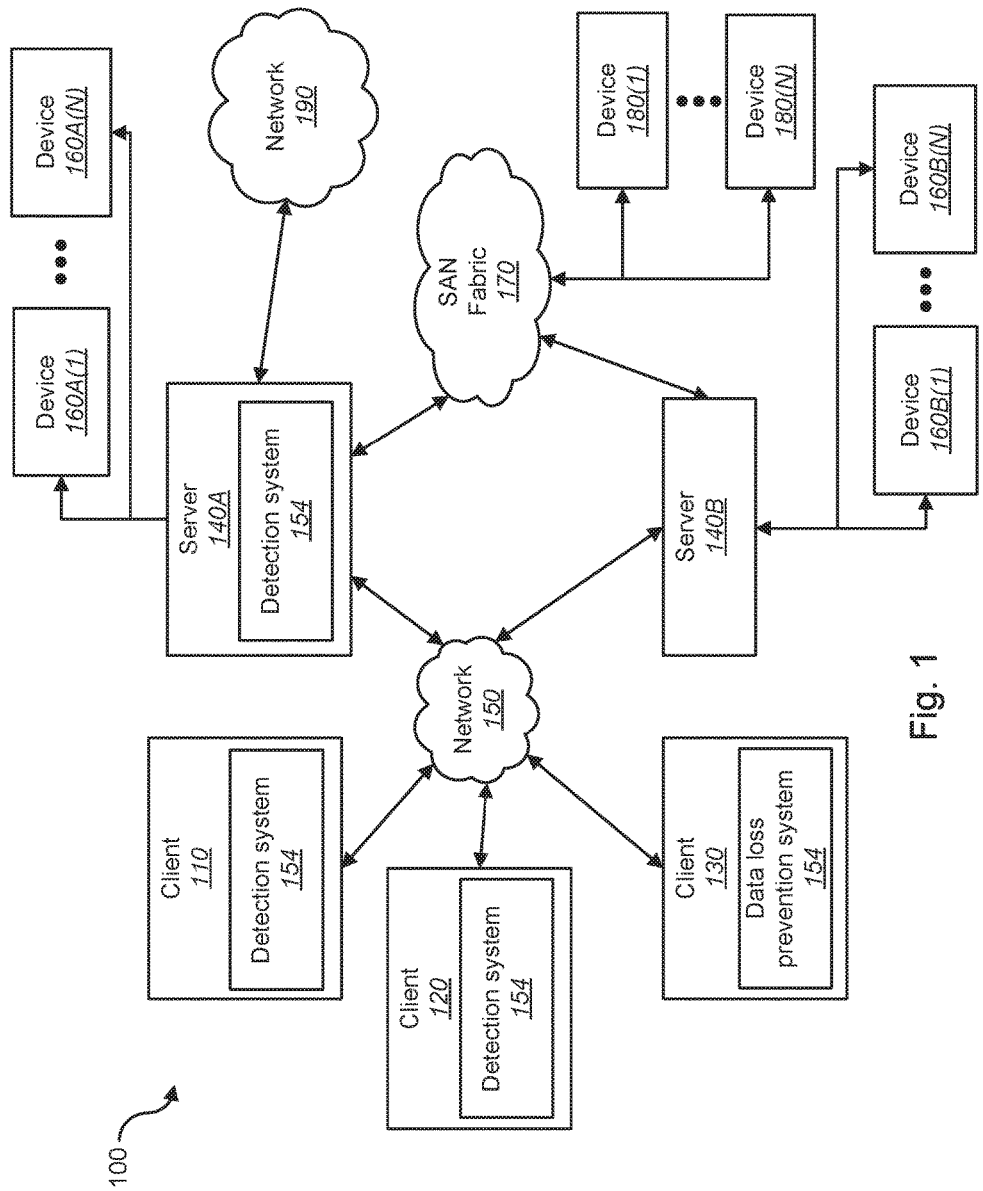
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
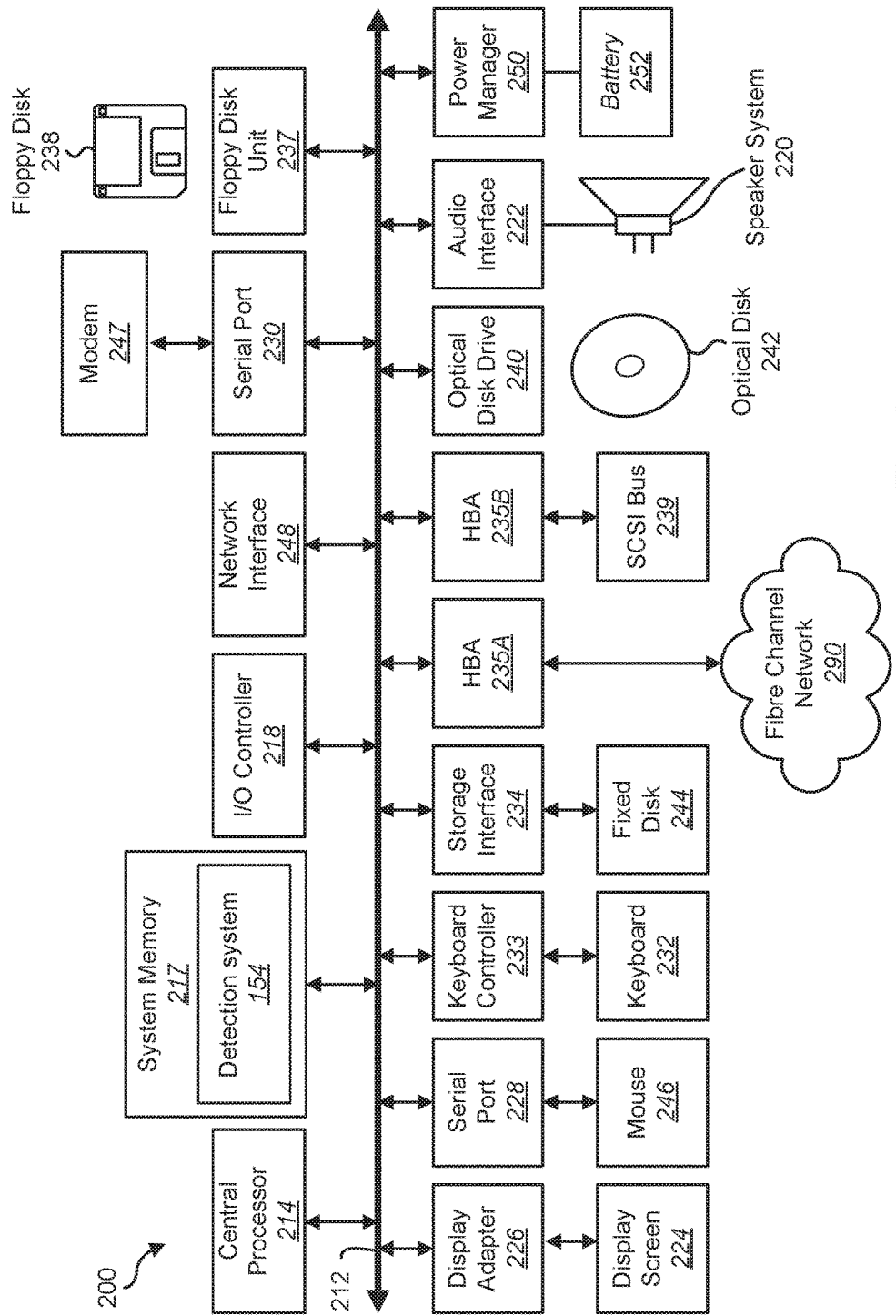
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, database servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more modules for implementation of secure applications such as, for example, detection system 154. Server 140A may include one or more modules such as, for example, detection system 154. Further, one or more portions of the detection system 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including detection system 154 may be implemented as part of a cloud computing environment. For example, detection system 154 may be distributed to various clients and servers through a cloud computer environment. For another example, detection system 154 may be updated at the network centric location and then distributed to various clients and servers.

FIG. 2 shows a block diagram of a computer system 200 in accordance with an embodiment of the present disclosure. Computer system 200 may be suitable for implementing methods and systems in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, detection system 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
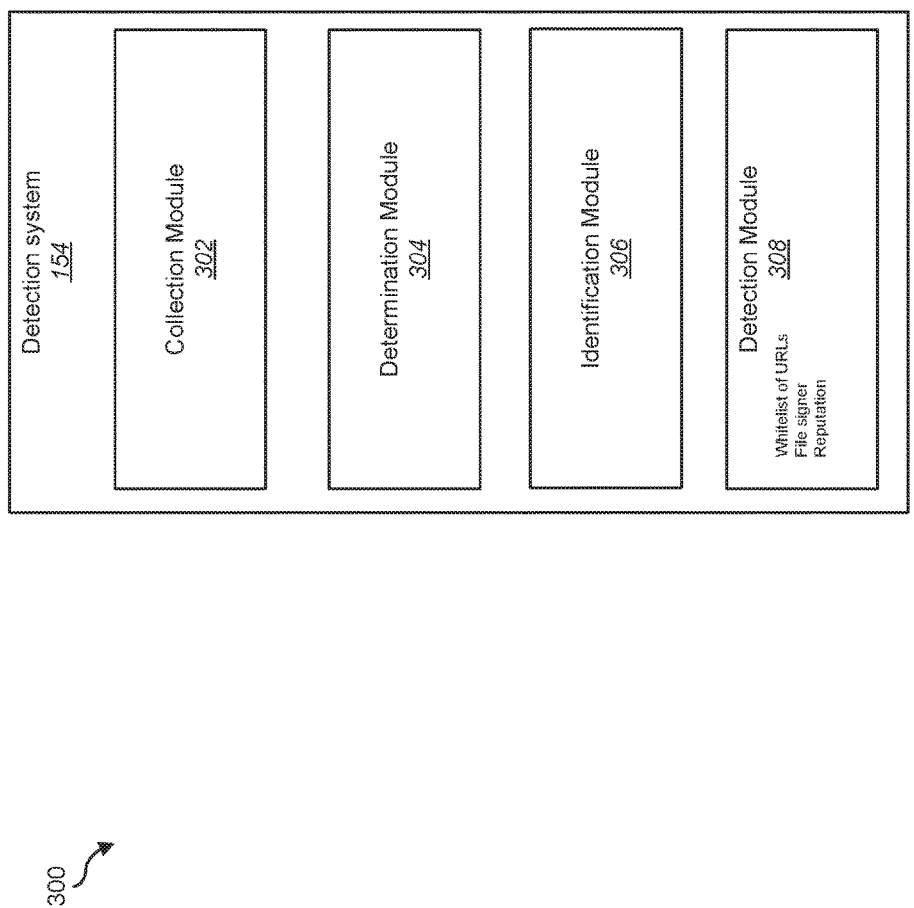
FIG. 3 shows a block diagram illustrating the detection system shown in FIG. 1 in accordance with an embodiment of the present disclosure.

FIG. 3 shows a block diagram illustrating the detection system shown in FIG. 1 in accordance with an embodiment of the present disclosure. Detection system 154 may reside on a client, such as an end-user device, and/or a server, such as a web server. In some embodiments, detection system 154 may include collection module 302, determination module 304, identification module 306, and detection module 308. Collection module 302 may collect at least one of a file or an attribute of a file. In some implementations, collection module 302 may collect files that are reported by a user or a client. For example, a user or client may report suspicious files to the collection module 302. In some implementations, collection module 302 may collect the files from emails. For example, collection module 302 may monitor a user's email account and gather all email attachments sent to the user. As another example, collection module 302 may be a module to a mail server or gateway, and configured to monitor emails and gather files from email attachments or from URLs that are present in the emails. In other implementations, collection module 302 may gather files from files downloaded from URLs. In yet other implementations, the files may be gathered from incidence response investigations and/or from other security researchers. The originating URLs of the files may be known. The files may be gathered from a list of URLs that are deemed as relevant, for example, high-risk URLs. In some embodiments, the files might not be collected. Rather, an attribute of a file may be collected. The attribute may include, but not limited to, an originating URL, a timeframe during which the file is associated with the URL, a signer of the file, and an author of the file.

Still referring to FIG. 3, determination module 304 may determine if a file is malicious. In some implementations, such determination is based on an attribute of the file. In some implementations, such determination is based the characteristics of the file, such as content, code structures, etc. The file may be compared against a database of known malware. The file may be determined based on behavioral heuristics. In other words, the file may be determined as malicious if its behavior is malicious (e.g., its behavior is similar to those of known malware), although the file may look different as compared to known malware. Known algorithms and methods, such as analyzing the code structure of the file and machine learning, may be utilized to determine if the file is malicious.

Determination module 304 may determine if the file is malicious based on external information. External information may include, but not limited to, news, blogs, information from the security community, information from the hacker's community, and suspicious behaviors of URLs. For example, hacker's community might be monitored to extract information that a specific URL will be used for a specific period of time to distribute malware. Relevant online blogs may be monitored and their content may be analyzed using data mining to discover information regarding malicious URLs and corresponding time frames. News, for example, from CNN or CNET, antivirus or security product vendors and other security researchers (e.g., Palo Alto Networks, Trend Micro, Kaspersky, Malware don't need Coffee, Malware Must Die, and Brian Krebs of Krebs on Security), may disclose that a specific URL is infected (i.e., malicious) for a specific period of time. In some embodiments, determination module 304 determines if a file is malicious based on external information only. In other words, the file may not need to be examined. In other embodiments, the determination is based on examining the file and/or an attribute of the file, together with the corroborating external information. For example, analysis on a file downloaded from http://foo.com/new on Feb. 2, 2015 shows that the file is malicious. News from Symantec on Feb. 3, 2015 also disclosed that http://foo.com/new had been malicious. Since the analysis and the news corroborate with each other, the file may then be determined as malicious. In some embodiments, the file is determined as malicious based on a plurality of corroborating information sources.

With continued reference to FIG. 3, if a file is determined as malicious by determination module 304, identification module 306 may identify a URL and a time frame associated with the file. Take the example as described above, if a file downloaded from http://foo.com/new on Feb. 2, 2015 was determined as malicious, identification module 306 may identify http://foo.com/new as the URL associated with the file and Feb. 2, 2015 as the time frame associated with the file. In some embodiments, a file may be associated with multiple URLs. For example, a malicious file, such as Trojan, may try to connect to a plurality of URLs, or try to download files from other URLs. These URLs may be embedded or included in the malicious file. In this case, identification 306 may identify a plurality of URLs associated with a file.

With continued reference to FIG. 3, detection module 308 may detect a threat based on the URL and the time frame associated with the malicious file. In some embodiments, detection module 308 may create a block policy based on the URL and the time frame associated with the malicious file. As described above, a malicious file may be associated with a plurality of URLs, such as http://foo2.com/new and http://foo3.com/new (e.g., the file downloaded from http://foo.com/new may try to connect to http://foo2.com/new and http://foo3.com/new). The block policy may have a time frame that is not the same as the time frame of the file. For example, the malicious file was downloaded from http://foo.com/new on Feb. 2, 2015. Information from Symantec on Feb. 3, 2015 indicated that http://foo.com/new had been malicious since Feb. 1, 2015 and continued to be malicious until Feb. 2, 2015. The block policy may then be based on the URLs http://foo.com/new, http://foo2.com/new, and http://foo3.com/new, and the time frame of Feb. 1, 2015 to Feb. 2, 2015.

In some embodiments, the policy based on the URL and the time frame of a malicious file may be applied on a device. For example, the policy as described above may be applied to a laptop computer. Based on the example policy described above, any files downloaded to the laptop computer from http://foo.com/new, http://foo2.com/new or http://foo3.com/new during the time frame of Feb. 1, 2015 to Feb. 2, 2015 may be blocked (e.g., prohibited from being launched and/or executed). In some embodiments, if the threat is ongoing, a firewall may be employed to block access, network connections, and/or file download from the one or more URLs associated with a malicious file. In other words, the block policy (e.g., the block definition) uses two attributes—the URL and the time frame—to detect malicious files. This approach may overcome the difficulties due to the polymorphism of malware.

In some embodiments, files associated with the URL and the time frame may be added to a knowledge base of malware. Such an approach may help creating malware signatures and enhance the knowledge base of malware. For the example described above, files downloaded to the laptop computer from http://foo.com/new, http://foo2.com/new or http://foo3.com/new during the time frame of Feb. 1, 2015 to Feb. 2, 2015 may be added to a knowledge base of malware. The downloaded files are malware and may help detect malware if they are added to a knowledge base of malware.

In some embodiments, false positives may be mitigated. For example, false positives may be mitigated based on a signer of a file, reputation of a URL, reputation of a file, whitelisted URLs. For example, for the example policy described above, not every file downloaded from one of the three URLs from Feb. 1, 2015 to Feb. 2, 2015 may be blocked. If the file is signed by a reputable signer, for example, by Microsoft, the file is then allowed to be executed and/or launched. If the file is reputable, such as an open-source software that is highly regarded in the community, the file is then allowed to be executed and/or launched. If the URL http://foo.com/new is a reputable URL or is whitelisted, files downloaded from http://foo.com/new will be further examined and may be allowed to be executed and/or launched.

Figure 4:
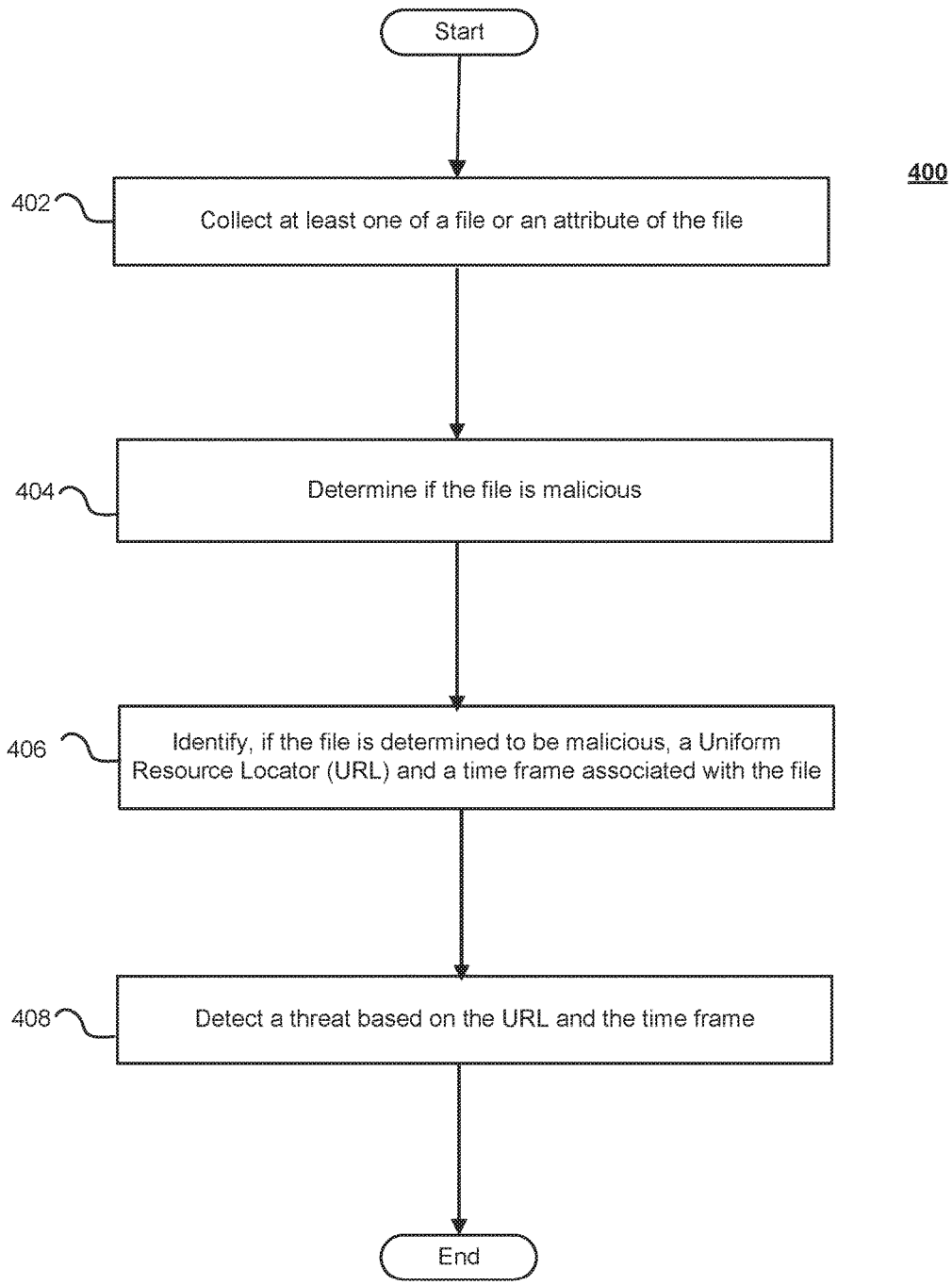
FIG. 4 shows a flowchart for the detection system in accordance with an example method of the present disclosure.

FIG. 4 shows a flowchart for the detection system in accordance with an example method of the present disclosure.

Method 400 may include: collecting at least one of a file or an attribute of the file (402); determining if the file is malicious (step 404); identifying, if the file is determined to be malicious, a URL and a time frame associated with the file (step 406); and detect a threat based on the URL and the time frame (step 408).

Method 400 may also include collecting at least one of a file or an attribute of the file (402). In some implementations, as described above, the file may be gathered from email attachments, suspicious files reported by a user, incidence response investigations and/or other security researchers. In some implementations, rather than a file, an attribute of the file may be gathered.

At step 404, method 400 may also include determining if the file is malicious. In some implementations, as described above, such determination may be based on external information, such as news, blogs, information from the hacker's community, and information from security researchers.

At step 406, if the file is determined to be malicious, a URL and a time frame associated with the file are identified. As described above, the file may be associated with a plurality of URLs. A malicious file may try to connect to other URLs, or try to download files from other URLs.

At step 408, a threat based the URL and the time frame is detected. As described above, a block policy based on the URL and the time frame may be created. The block policy may be based on a plurality of URLs. The block policy may have a time frame that is not the same as the time frame of the file. The block policy may use reputation, file signers to mitigate false positives.

At this point it should be noted that the detection system in accordance with the present disclosure as described above may involve the processing of input data and the generation of output data to some extent. This input data processing and output data generation may be implemented in hardware or software. For example, specific electronic components may be employed in a collection module, determination model, identification model, detection module, or similar or related circuitry for implementing the functions associated with data loss prevention in accordance with the present disclosure as described above. Alternatively, one or more processors operating in accordance with instructions may implement the functions associated with data loss prevention in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for detecting malicious files comprising:
one or more computer processors communicatively coupled to a network, the one or more computer processors being configured to:
collect at least one of a file or an attribute of the file;
determine if the file is malicious;
identify, if the file is determined to be malicious, a download Uniform Resource Locator (URL) from which the file was downloaded, a connection URL to which the file attempted to connect, and a limited time frame associated with the file, the limited time frame having a beginning point in time and an ending point in time; and
create a block policy for the download URL and the connection URL that is configured to be applied only for the limited time frame, the block policy configured to block any network connection with, or block any file from downloading and executing from, the download URL and the connection URL during the limited time frame.

2. The system of claim 1, wherein the one or more computer processors are further configured to determine if the file is malicious based on external information retrieved from a security product vendor.

3. The system of claim 1, wherein the block policy is configured to block any file downloaded from the download URL during the limited time frame from executing.

4. The system of claim 3, wherein the block policy is configured to allow any file downloaded from the download URL after the limited time frame to execute.

5. The system of claim 1, wherein the block policy is configured to block any network connection with the download URL during the limited time frame.

6. The system of claim 5, wherein the block policy is configured to allow a network connection with the download URL after the limited time frame.

7. The system of claim 1, wherein the connection URL is a URL to which the file further attempted to download another file.

8. A computer-implemented method for detecting malicious files, the method comprising:
collecting at least one of a file or an attribute of the file;
determining if the file is malicious;
identifying, if the file is determined to be malicious, a download Uniform Resource Locator (URL) from which the file was downloaded, a connection URL to which the file attempted to connect, and a limited time frame associated with the file, the limited time frame having a beginning point in time and an ending point in time; and
creating a block policy for the download URL and the connection URL that is configured to be applied only for the limited time frame, the block policy configured to block any network connection with, or block any file from downloading and executing from, the download URL and the connection URL during the limited time frame.

9. The method of claim 8, further comprising determining if the file is malicious based on external information retrieved from a security product vendor.

10. The method of claim 8, wherein the block policy is configured to block any file downloaded from the download URL during the limited time frame from executing.

11. The method of claim 10, wherein the block policy is configured to allow any file downloaded from the download URL after the limited time frame to execute.

12. The method of claim 8, wherein the block policy is configured to block any network connection with the download URL during the limited time frame.

13. The method of claim 12, wherein the block policy is configured to allow a network connection with the download URL after the limited time frame.

14. The method of claim 8, wherein the connection URL is a URL to which the file further attempted to download another file.

15. A non-transitory computer readable medium storing instructions thereon that are configured to be executed by at least one processor and thereby cause the at least one processor to operate so as to:
collect at least one of a file or an attribute of the file;
determine if the file is malicious;
identify, if the file is determined to be malicious, a download Uniform Resource Locator (URL) from which the file was downloaded, a connection URL to which the file attempted to connect, and a limited time frame associated with the file, the limited time frame having a beginning point in time and an ending point in time; and
create a block policy for the download URL and the connection URL that is configured to be applied only for the limited time frame, the block policy configured to block any network connection with, or block any file from downloading and executing from, the download URL and the connection URL during the limited time frame.

16. The non-transitory computer readable medium according to claim 15, wherein the instructions are further configured to cause the at least one processor to operate so as to determine if the file is malicious based on external information retrieved from a security product vendor.

17. The non-transitory computer readable medium according to claim 15, wherein the block policy is configured to block any file downloaded from the download URL during the limited time frame from executing.

18. The non-transitory computer readable medium according to claim 17, wherein the block policy is configured to allow any file downloaded from the download URL after the limited time frame to execute.

19. The non-transitory computer readable medium according to claim 15, wherein:
the block policy is configured to block any network connection with the download URL during the limited time frame; and
the block policy is configured to allow a network connection with the download URL after the limited time frame.

20. The non-transitory computer readable medium according to claim 15, wherein the connection URL is a URL to which the file further attempted to download another file.

* * * * *